US012649076B2

(12) United States Patent
Shin

(10) Patent No.: US 12,649,076 B2
(45) Date of Patent: Jun. 9, 2026

(54) FIRE EXTINGUISHING SYSTEM FOR VEHICLE BATTERY

(71) Applicants: Hyundai Motor Company, Seoul (KR); Kia Corporation, Seoul (KR)

(72) Inventor: Hyeon Gi Shin, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 899 days.

(21) Appl. No.: 17/930,185

(22) Filed: Sep. 7, 2022

(65) Prior Publication Data

US 2023/0092270 A1     Mar. 23, 2023

(30) Foreign Application Priority Data

Sep. 15, 2021     (KR) ......................... 10-2021-0122828

(51) Int. Cl.
| | |
|---|---|
| *A62C 37/40* | (2006.01) |
| *A62C 3/16* | (2006.01) |
| *H01M 50/383* | (2021.01) |

(52) U.S. Cl.
CPC ................ *A62C 37/40* (2013.01); *A62C 3/16* (2013.01); *H01M 50/383* (2021.01)

(58) Field of Classification Search
CPC ........... A62C 3/07; A62C 3/16; H01M 50/383
USPC .......................................................... 169/62
See application file for complete search history.

(56) References Cited

U.S. PATENT DOCUMENTS

| | | | | |
|---|---|---|---|---|
| 11,715,963 B1 * | 8/2023 | Hays | ..................... | H02J 7/0042 |
| | | | | 169/54 |
| 2005/0170238 A1 * | 8/2005 | Abu-Isa | .............. | H01M 50/117 |
| | | | | 429/82 |
| 2012/0111444 A1 * | 5/2012 | Hermann | .......... | H01M 10/6567 |
| | | | | 429/120 |
| 2014/0186668 A1 * | 7/2014 | Jung | ................... | H01M 10/613 |
| | | | | 429/61 |
| 2017/0304662 A1 * | 10/2017 | Staudenmaier | ..... | H01M 50/204 |
| 2017/0361139 A1 * | 12/2017 | Koreis | ..................... | A62C 3/16 |
| 2020/0086152 A1 * | 3/2020 | Stadler | ................. | H01M 50/30 |
| 2022/0193471 A1 * | 6/2022 | Zhang | ..................... | A62C 3/07 |

FOREIGN PATENT DOCUMENTS

| | | |
|---|---|---|
| CN | 112018300 A | 12/2020 |
| KR | 101238062 B1 | 2/2013 |
| KR | 101998280 B1 | 7/2019 |

* cited by examiner

*Primary Examiner* — Cody J Lieuwen
(74) *Attorney, Agent, or Firm* — MCDONNELL BOEHNEN HULBERT & BERGHOFF LLP

(57) ABSTRACT

Proposed is a fire extinguishing system for a vehicle battery. A pressure balancing element disposed on a battery pack provides a gas path between inside and outside a battery housing. A gas path portion connected to the pressure balancing element through a ventilation valve has a terminal end open to the air, allowing gas to move between the gas path and the air. A main fire detector disposed on the gas path portion detects a fire in the battery pack. A controller outputs a control signal to extinguish the fire. An extinguishing agent supply unit supplies a fire extinguishing agent to the gas path portion through the ventilation valve and the pressure balancing element in response to the control signal. A fire occurring in the battery pack is rapidly and accurately detected and immediately and effectively extinguished.

18 Claims, 10 Drawing Sheets

Current Value : A1
Resistance Value : R1

FIRE EXTINGUISHING SYSTEM FOR VEHICLE BATTERY

CROSS REFERENCE TO RELATED APPLICATIONS

The present application claims priority to Korean Patent Application No. 10-2021-0122828, filed Sep. 15, 2021, the entire contents of which are incorporated herein for all purposes by this reference.

TECHNICAL FIELD

The present disclosure relates generally to a fire extinguishing system for a vehicle battery and, more particularly, to a fire extinguishing system for a vehicle battery, the system being configured to rapidly and accurately detect a fire occurring inside a battery pack and effectively extinguish the fire immediately upon detection.

BACKGROUND

Recently, with increasing interest in energy efficiency and issues such as environmental pollution and depletion of fossil fuel, eco-friendly vehicles able to substantially replace internal combustion engine (ICE) vehicles have been developed.

Eco-friendly vehicles may include battery electric vehicles (BEV) using a battery as a power source, fuel cell electric vehicles (FCEV) using a fuel cell as a power source, hybrid electric vehicles (HEV) using both an engine and a motor as a vehicle driving power source, etc.

Such eco-friendly vehicles (xEV) share a common feature in that the motor is driven using power charged in the battery to propel each vehicle, and thus may be collectively referred to as electric vehicles in a broad sense. A high-voltage battery pack is mounted on such an electric vehicle to supply power to the motor. The high-voltage battery pack supplies power to electric parts in the vehicle, such as the motor, while being repeatedly charged and discharged during operation of the vehicle.

The battery pack of an electric vehicle generally includes a battery housing, a battery module disposed inside the battery housing, and a battery management system (BMS) detecting the voltage, current, temperature, and the like of cells of the battery module and controlling the operation of the cells. In addition, the battery pack also has a configuration to blow a fuse or block a relay connected to an inverter in order to prevent a fire when an internal short-circuit occurs or overcurrent flows.

In electric vehicles, a fire may occur inside the battery pack during driving, due to various reasons, such as collision or malfunction of parts. When the fire in the battery pack is not properly extinguished, the vehicle may catch fire, thereby causing significant material and human damage. Recently, as the use of electric vehicles increases, a danger in that a fire may occur on the battery or high-voltage electric wiring surrounding the battery due to external impact, an internal short-circuit, or the like is also increasing.

In particular, a fire in the battery may spread within a short time due to the internal and external structures and the composition of the battery. Since many occupants are aboard a public transportation vehicle, such as a bus, a rapid response to a fire is essentially required. When the initial response fails, a catastrophic accident may occur.

However, commonly known methods for responding to a fire, which are currently used in vehicles, merely include provision and use of a fire extinguisher. Even in this case, when a driver fails to use the fire extinguisher on time, the fire may spread to the entire vehicle. When a fire has occurred on the battery, materials inside the battery make it difficult to completely extinguish the fire by only using a small fire extinguisher or injecting a fire extinguishing agent to the fire.

In addition, since the driver is inside the vehicle during driving of the vehicle, it is difficult for the driver to notice the fire before a large amount of smoke is produced. Differently from a passenger vehicle, the large and long body of the bus makes it more difficult to notice a fire.

Furthermore, the battery pack mounted on the vehicle roof includes an external protective structure, such as a housing, covering the battery cells, depending on the vehicle type, as in large buses. Thus, even in the case that the driver notices a fire on time, it is difficult to inject the fire extinguishing agent into the battery housing. Even when the fire extinguishing agent is injected, the fire extinguishing agent may not arrive the battery cells within the battery housing. Thus, it is impossible to effectively extinguishing the fire.

In particular, in the related art, when a plurality of battery packs is mounted on a large bus or the like, an expensive fire detector is disposed on each of the battery packs in order to identify a battery pack in which a fire has occurred, thereby significantly increasing cost. In addition, even in the case that an expensive gas detector (i.e., gas concentration sensor) detecting a gas concentration is disposed as a fire detector on each of the battery packs, there still is possibility of erroneous detection.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to propose a fire extinguishing system for a vehicle battery, the system being configured to rapidly and accurately detect a fire occurring inside a battery pack and effectively extinguish the fire immediately upon detection.

The objective of the present disclosure is not limited to the aforementioned description, and other objectives not explicitly disclosed herein will be clearly understood by a person having ordinary skill in the art from the description provided hereinafter.

In order to achieve the above objective, according to one aspect of the present disclosure, there is provided a fire extinguishing system for a vehicle battery. The fire extinguishing system may include: a pressure balancing element disposed on a battery pack and providing a path through which gas moves between inside and outside a battery housing; a gas path portion connected to the pressure balancing element through a ventilation valve, having a terminal end open to an ambient atmosphere, and configured such that gas moves between the gas path and the ambient atmosphere; a main fire detector disposed on the gas path portion to detect a fire in the battery pack; a controller outputting a control signal to extinguish the fire when the fire in the battery pack is detected by the main fire detector; and an extinguishing agent supply unit configured to supply a fire extinguishing agent to the gas path portion in response to the control signal of the controller, so that the fire extinguishing agent is supplied to the battery pack in which a fire has occurred through the ventilation valve and the pressure balancing element.

As set forth above, the fire extinguishing system according to the present disclosure can rapidly and accurately detect a fire occurring on a battery of a vehicle and effectively extinguish the fire immediately upon detection.

In particular, according to the present disclosure, the inexpensive sub-fire detectors capable of being configured in a simple manner are disposed on the battery packs, respectively, and the single fire detector (i.e., the gas concentration sensor) measuring the concentration of gas is disposed on the main path portion. Accordingly, it is possible to determine both whether or not a fire has occurred and a battery pack in which a fire has occurred from among a plurality of battery packs using only the single main fire detector, which is expensive.

Furthermore, the use of the inexpensive sub-fire detectors to distinguish and identify the battery pack in which a fire has occurred and the use of the single main fire detector to determine whether or not a fire has occurred in the battery, which is expensive, make it possible to reliably prevent erroneous fire detection, improve the accuracy of fire detection, and significantly reduce cost compared to a related-art situation in which an expensive gas concentration sensor is disposed on every battery pack.

In addition, since the fire extinguishing system according to the present disclosure performs the function of the pressure balancing element of the related art, the fire extinguishing system according to the present disclosure alone can balance the pressure of each battery pack without having to dispose several pressure balancing elements on each battery pack.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
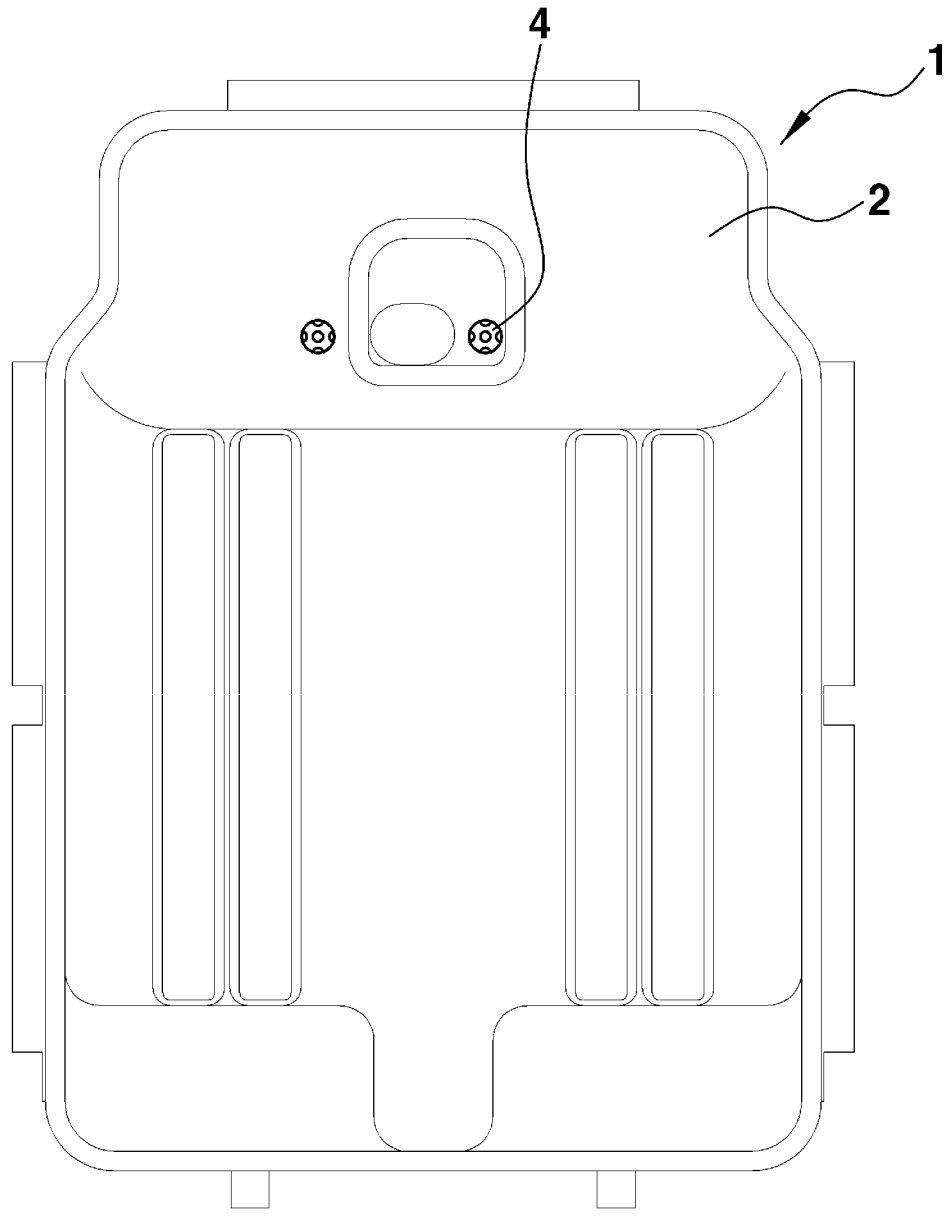
FIG. 1 is a schematic view illustrating a battery housing in which known pressure balancing elements are disposed.

Specific structural and functional descriptions of embodiments of the present disclosure disclosed herein are only for illustrative purposes of the embodiments of the present disclosure. The present disclosure may be embodied in many different forms without departing from the spirit and significant characteristics of the present disclosure. In addition, the present disclosure is intended to cover not only the exemplary embodiments, but also various alternatives, modifications, equivalents, and other embodiments that may be included within the spirit and scope of the present disclosure.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled", "connected", or "linked" to another element, it can be directly coupled or connected to the other element or intervening elements may be present therebetween. In contrast, it should be understood that when an element is referred to as being "directly coupled", "directly connected", or "directly connected" to another element, there are no intervening elements present. Other expressions that explain the relationship between elements, such as "between", "directly between", "adjacent to", or "directly adjacent to" should be construed in the same way.

The terminology used herein is for the purpose of describing particular embodiments only and is not intended to be limiting. Throughout the specification, the same reference numerals will refer to the same or like parts. The terminologies used herein are for the purpose of describing particular embodiments only and are not intended to limit the present disclosure. As used herein, singular forms are intended to include plural forms as well, unless the context clearly indicates otherwise. It will be further understood that the terms "comprise", "include", "have", etc. when used in this specification, specify the presence of stated features, integers, steps, operations, elements, components, and/or combinations thereof but do not preclude the presence or addition of one or more other features, integers, steps, operations, elements, components, and/or combinations thereof.

Hereinafter, embodiments of the present disclosure will be described in detail with reference to the accompanying drawings.

The present disclosure is intended to provide a fire extinguishing system for a vehicle battery, the system being configured to rapidly and accurately detect a fire occurring inside a battery pack and effectively extinguish the fire immediately upon detection.

When the occurrence of a fire in a battery pack in a vehicle can be detected in an early stage, it is possible to provide a warning of the fire to a driver and occupants on time so as to rapidly and safely escape from the vehicle. In this regard, the fire extinguishing system according to the present disclosure is configured to detect a fire occurring on a battery pack and immediately and automatically provide a warning and extinguish the fire.

First, a typical fire occurrence mechanism of batteries disposed in electric vehicles will be described as follows: When a battery has an overvoltage or an impact externally applied thereto, a separator may be damaged or torn apart. The damaged separator may cause electrolyte to be pyrolyzed. Here, flammable gas is discharged from the battery cell, and a point in time at which the flammable gas is a point in time at which the fire may be extinguished in the early stage.

Afterwards, when gas expands in the battery and gas and electrolyte leak from the battery cell, thermal runaway may occur, thereby exploding the battery. From this point in time, it may be almost impossible to extinguish the fire.

According to the present disclosure, a fire is detected using gas discharged from a battery cell in an early stage in which the fire in the battery cell can be extinguished, i.e., a flammable gas discharge stage. That is, by detecting the gas discharged through, for example, hydrolysis of the electrolyte in the battery cell, whether or not a fire has occurred is detected and determined in an early stage.

Here, a pressure balancing element disposed on the battery pack to detect gas is used. The pressure balancing element is essentially disposed on the battery pack disposed in the vehicle.

A typical battery pack for a vehicle includes a battery housing and a battery module disposed inside the battery housing. The battery module is comprised of a plurality of unit cells, i.e., battery cells. In addition, in the battery pack, the battery cells of the battery module are sealed inside the battery housing.

In this configuration, the temperature inside the battery housing is repeatedly raised and lowered depending on the charging and discharging states of the battery cells. When the internal temperature is repeated raised and lowered, a path is essentially required between the inside and the outside of the battery housing, such that gas may enter and exit the battery housing through the path.

The presence of the gas path in the battery housing is essentially required, so that the pressure inside and the battery housing and the pressure outside the battery housing may remain in balance, thereby preventing the battery pack from expanding or contracting. For this, the battery housing of the battery pack is provided with a pressure balancing element forming the path through which gas enters and exits the battery housing.

FIG. 1 is a schematic view illustrating a battery housing in which known pressure balancing elements are disposed. As illustrated in FIG. 1, pressure balancing elements 4 through which gas enters and exits the battery housing 2 in ordinary times are provided in a battery housing 2 of a battery pack 1. Each of the pressure balancing elements 4 has a path through which gas enters and exits.

A battery module (not shown) is accommodated inside the battery housing 2 illustrated in FIG. 1. Battery cells of the battery module remain sealed in the battery housing. Depending on the charging and discharging states of the battery cells in the battery pack 1, the temperature inside the battery housing 2 is repeatedly raised and lowered.

Here, in order to prevent the battery housing 2 from being expanded or contracted, a plurality of pressure balancing elements 4 is disposed in the battery housing to allow gas to move from the inside to the outside the battery housing and vice versa through gas paths in ordinary times. Thus, the expansion and contraction of the battery housing 2 may be prevented, and the pressure inside the battery housing and the pressure outside the battery housing may remain in balance.

Figure 2:
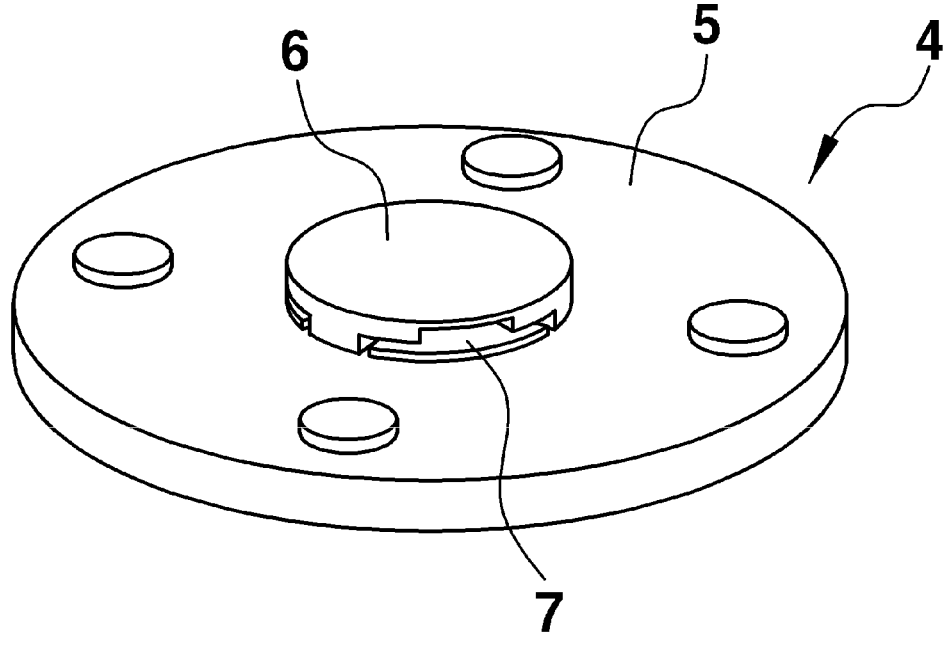
FIG. 2 is a perspective view illustrating the known pressure balancing element.

FIG. 2 is a perspective view illustrating the known pressure balancing element, as a reference view for a better understanding of the present disclosure. As illustrated in FIG. 2, the known pressure balancing element 4 includes a plate 5 fixed to and in close contact with the outer surface of the battery housing and a vent portion 6 integrally provided on the central portion of the vent portion 6 and having defined therein a path through which gas moves between inside and outside the battery housing.

In the known pressure balancing element 4 as described above, the vent portion 6 provided in the central portion has a plurality of vent holes 7 allowing gas to pass therethrough, as paths through which gas may move between inside and outside the battery housing. Thus, in a situation in which the plate 5 is fixed to the outer surface of the battery housing, gas may pass through the vent holes 7 of the vent portion 6 to perform pressure balancing between inside and outside the battery housing.

In the known pressure balancing element 4, in order to prevent external moisture from entering the battery housing through the vent holes 7 (i.e., gas paths) provided in the vent portion 6, the vent holes are configured to have a small size. Since a single vent hole has insufficient pressure adjusting (i.e. pressure balancing) performance, the plurality of vent holes is provided in each of the pressure balancing element, and the plurality of pressure balancing elements is disposed in every battery pack.

According to the present disclosure, the pressure balancing element is configured to perform a pressure adjusting (i.e., pressure balancing) function in ordinary times and selectively discharge gas produced from the battery cell to a path (i.e., a gas path portion in the following description) in which the main fire detector is positioned, instead of discharging the gas to the outside.

Figure 3:
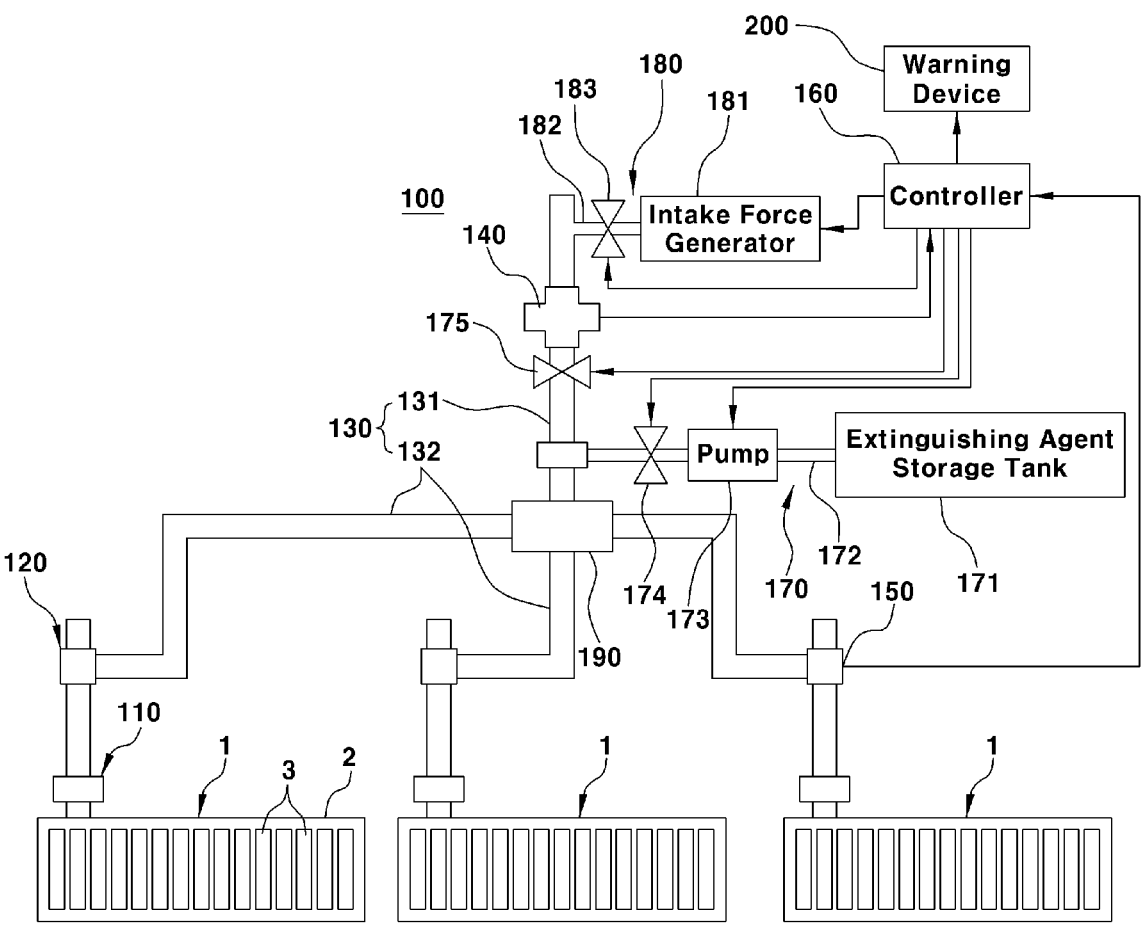
FIG. 3 is an overall configuration diagram illustrating a fire extinguishing system according to embodiments of the present disclosure.
Figure 4:
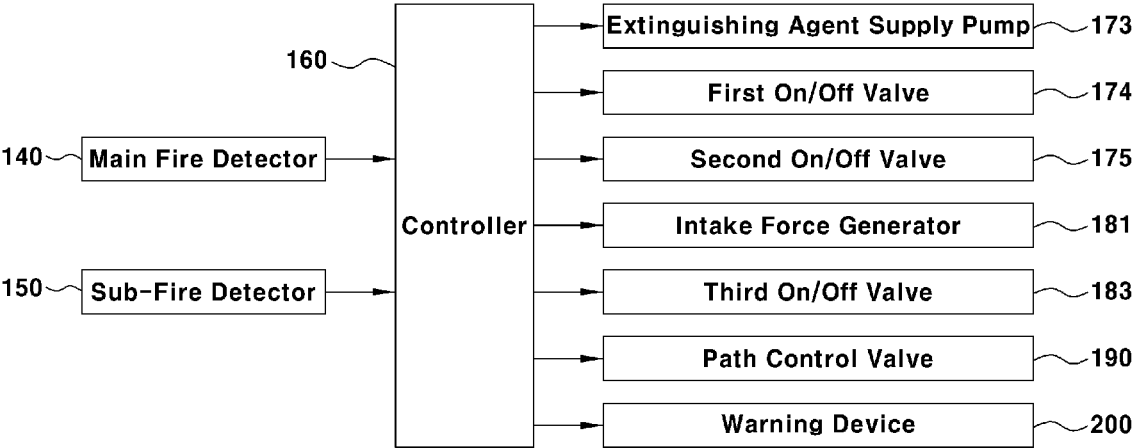
FIG. 4 is a block diagram illustrating the detecting element, the control element, and the operating element of the fire extinguishing system according to embodiments of the present disclosure.

FIG. 3 is an overall configuration diagram illustrating a fire extinguishing system according to embodiments of the present disclosure. The embodiment illustrated in FIG. 3 is configured to detect a fire in a plurality of battery packs 1, e.g., three battery packs, and perform fire extinguishing immediately upon detection. In addition, FIG. 4 is a block diagram illustrating the detecting element, the control element, and the operating element of the fire extinguishing system according to embodiments of the present disclosure.

A fire extinguishing system 100 according to embodiments of the present disclosure is configured to selectively perform fire extinguishing on a battery pack in which a fire has occurred among the plurality of battery packs 1. Although FIG. 3 illustrates an embodiment able to perform fire extinguishing in a case in which the number of entire battery packs 1 is 3. It is also possible to variously change the number of battery packs that the fire extinguishing system according to the present disclosure can manage in the occurrence of a fire by using a three-way valve, a five-way valve, a six-way valve, or the like in place of a four-way valve as a flow path control valve 190 to be described below.

Figure 5:
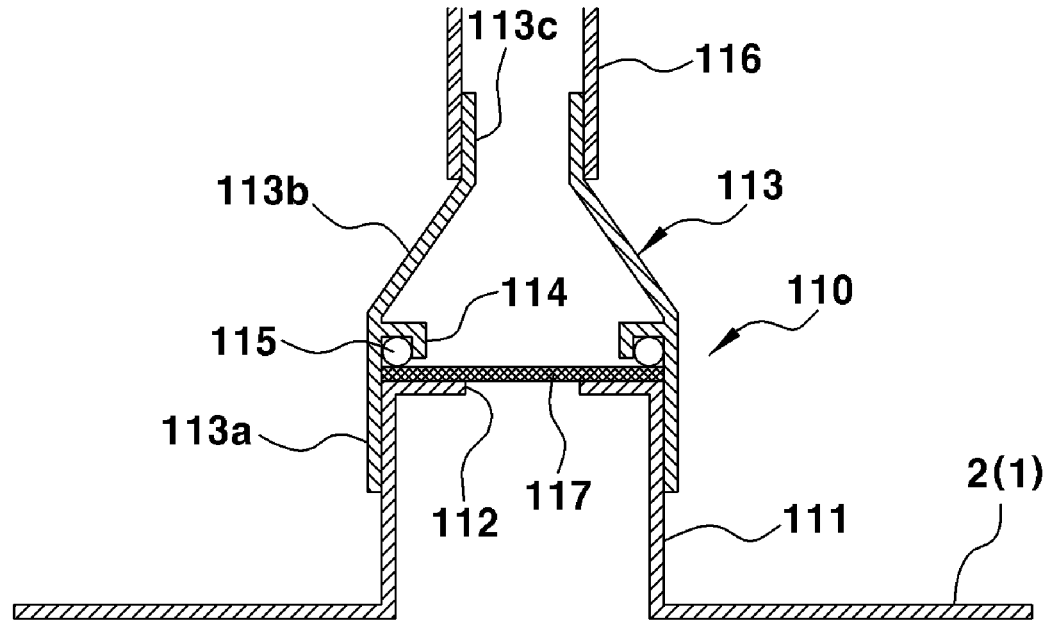
FIG. 5 is a cross-sectional view illustrating the pressure balancing element disposed on the battery housing of the battery pack according to embodiments of the present disclosure.

The configuration will be described in detail as follows: The fire extinguishing system 100 according to embodiments of the present disclosure includes a pressure balancing element 110 disposed on each of the battery packs 1. FIG. 5 is a cross-sectional view illustrating the pressure balancing element 110 disposed on the battery housing 2 of the battery pack 1 according to embodiments of the present disclosure.

As illustrated in FIG. 5, the pressure balancing element 110 includes: a vent portion 111 provided on the battery housing 2 of the battery pack 1 and having a vent hole 112 defined therein, the vent hole 112 allowing gas to pass therethrough to move between inside and outside the battery housing; a connector 113 coupled to the vent portion such that the internal space thereof communicates with the vent hole 112 of the vent portion 111; and a venting path portion 116 having a structure extending a predetermined length from the connector 113. The venting path portion 116 is configured such that the inner path thereof communicates with the internal space of the connector 113, the vent hole 112, and the internal space of the vent portion 111.

As described above, in the known pressure balancing element, the vent hole of the vent portion, formed as a gas path to prevent moisture penetration, has a very small scale and a very small path cross-section. In contrast, in pressure balancing element 110 according to the present disclosure, the vent hole 112 having a relatively large size and a relatively large path cross-section is provided in the vent portion 111. The connector 113 and the venting path portion 116 extending predetermined distances from the vent hole 112 are disposed. As long as only the connecting portions of these components are properly maintained in an airtight state, there is substantially no possibility that moisture may enter the battery housing 2 through the venting path portion 116 having a predetermined length.

In an example embodiment, a waterproof ventilation membrane member 117 capable of blocking entrance of external moisture while allowing gas to pass therethrough may be disposed in the vent hole 112 of the vent portion 111. Here, as illustrated in FIG. 5, the waterproof ventilation membrane member 117 is configured to close the vent hole 112 of the vent portion 111.

In embodiments of the present disclosure, the waterproof ventilation membrane member 117 may be implemented as a fluorine resin film capable of allowing gas to pass therethrough while blocking moisture, more particularly, a film/membrane shaped material made of expanded polytetrafluoroethylene (ePTFE) commonly known as a tradename Gore-Tex®.

Here, the waterproof ventilation membrane member 117 capable of blocking moisture from entering the battery housing 2 from the outside through the vent hole 112 of the vent portion 111 while allowing moisture to be discharged from the battery housing 2 may be used.

The vent portion 111 may be provided in the shape of a pipe protruding outward from the surface of the battery housing 2. The vent hole 112 having a set diameter or size is provided on the protruding end of the vent portion 111. In embodiments of the present disclosure, the vent portion 111 may be provided in the shape of a pipe having a circular cross-section, i.e., a cylindrical pipe, extending outward from the surface of the battery housing 2.

The connector 113 is configured such that a large diameter portion 113a having a relatively large diameter is provided on one end, a small diameter portion 113c having a diameter smaller than the diameter of the large diameter portion 113a is provided on the other end, and a diameter reducing portion 113b connects the large diameter portion 113a and the small diameter portion 113c. The diameter reducing portion 113b is configured such that the diameter thereof gradually decreases in the direction from the large diameter portion 113a to the small diameter portion 113c.

The large diameter portion 113a is screw-engaged with the outer circumferential surface of the vent portion 111. In this regard, a thread is provided on the inner circumferential surface of the large diameter portion 113a, and a thread is provided on the outer circumferential surface of the vent portion 111. In addition, the small diameter portion 113c is coupled to the venting path portion 116. The inner circumferential surface of the small diameter portion 113c may be coupled to the outer circumferential surface of the venting path portion 116, or the outer circumferential surface of the small diameter portion 113c may be coupled to the inner circumferential surface of the venting path portion 116.

Here, both the corresponding surfaces of the small diameter portion 113c and the venting path portion 116 may be fixedly coupled by heat sealing. The venting path portion 116 may be implemented as a pipe-shaped member, such as a hose or a tube, and the connector 113 may be implemented as a heat sealable material.

In addition, a sealing protrusion 114 may be provided on the inner circumferential surface of the connector 113 to protrude radially inward. The connector 113 and the vent portion 111 are screw-engaged with each other such that the sealing protrusion 114 presses the waterproof ventilation membrane member 117 against the vent portion 111 through a sealing member 115 situated between the sealing protrusion 114 and the waterproof ventilation membrane member 117. The sealing member 115 is provided to maintain airtightness (i.e., sealing) between the connector 113, the vent portion 111, and the waterproof ventilation membrane member 117, and may be an O-ring made of an elastic material, such as rubber.

The waterproof ventilation membrane member 117 is disposed to be seated on the outer surface of the protruding end of the vent portion 111. When the large diameter portion 113a of the connector 113 is screw-engaged with the outer circumferential surface of the vent portion 111, the large diameter portion 113a is pressed against the vent portion 111 by the sealing protrusion 114 and the sealing member 115. The peripheral portions of the waterproof ventilation membrane member 117 may be pressed by the sealing protrusion 114 and the sealing member 115, thereby being fixed to the outer surface of the protruding end of the vent portion 111.

In embodiments of the present disclosure, the sealing protrusion 114 may be provided on the inner circumferential surface of the large diameter portion 113a of the connector 113 so as to have a turned L(⌐) shaped cross-section with one open end. Thus, in a situation in which the circular sealing member 115 is inserted into the sealing protrusion 114 having the ⌐-shaped cross-section, when the large diameter portion 113a of the connector 113 is screw-engaged with the vent portion 111, the sealing member 115 may be easily pressed against the waterproof ventilation membrane member 117 through the open portion of the sealing protrusion 114.

According to the present disclosure, it is possible to design the size of the vent hole 112, i.e., a gas path through which gas passes, in a relatively free manner. In particular, it is possible to configure the vent hole 112 to be greater than the vent hole 112 of the known pressure balancing element 110. According to the present disclosure, the number pressure balancing elements per each battery pack may be advantageously reduced to be one (1).

In addition, as illustrated in FIG. 3, the fire extinguishing system 100 according to embodiments of the present disclosure may further include: a ventilation valve 120 disposed on an outlet side of the venting path portion (designated with reference numeral "116" in FIG. 5) of the pressure balancing element 110 disposed in the battery pack 1; and a gas path portion 130 extending from the ventilation valve 120 and being open such that a terminal end thereof is exposed to the ambient atmosphere.

In addition, the fire extinguishing system 100 according to embodiments of the present disclosure may further include: a main fire detector 140 disposed on the gas path portion 130; a controller 160 outputting a control signal to supply an extinguishing agent to the battery pack 1 in which a fire has occurred when the occurrence of a fire is detected by the main fire detector 140; and an extinguishing agent supply unit 170 operating to supply the extinguishing agent through the gas path portion 130 to catch the fire in the battery pack 1 in response to the control signal output by the controller 160.

Here, the controller 160 may be a battery management system (BMS).

Figure 6:
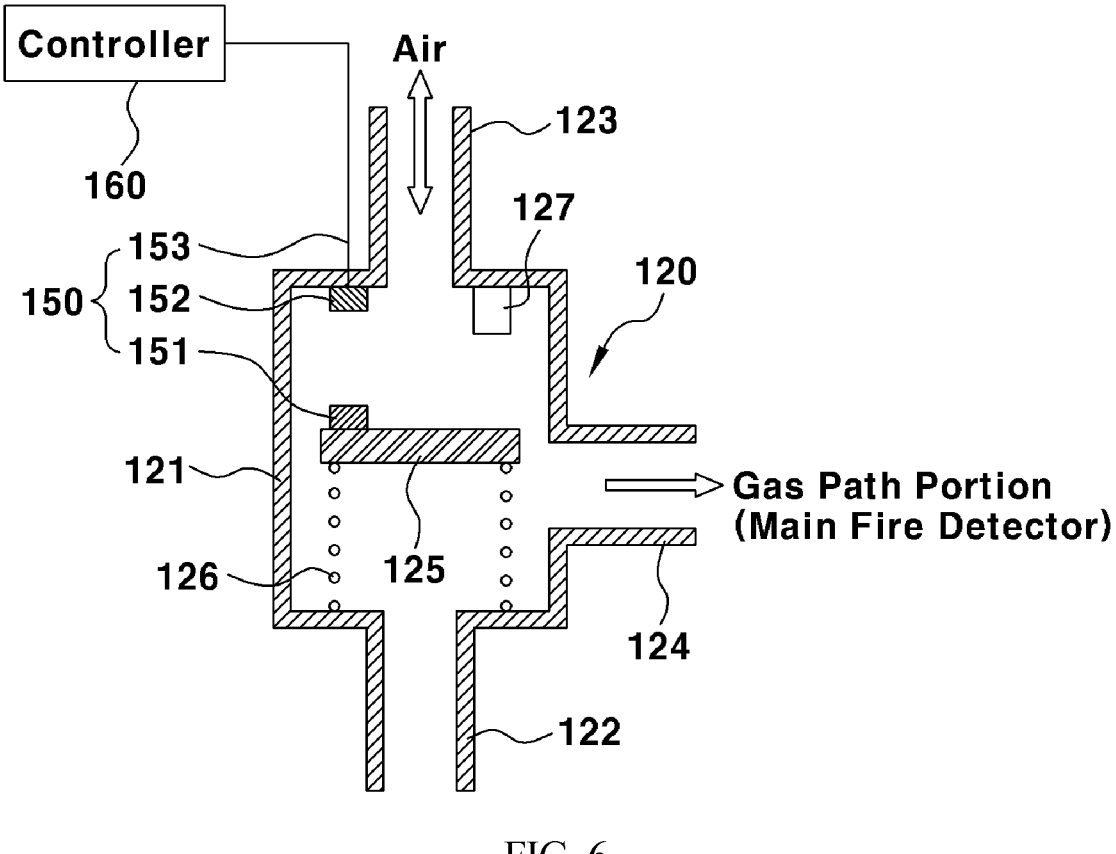
FIG. 6 is a cross-sectional view illustrating the configuration of the ventilation valve in the fire extinguishing system according to embodiments of the present disclosure.
Figure 7:
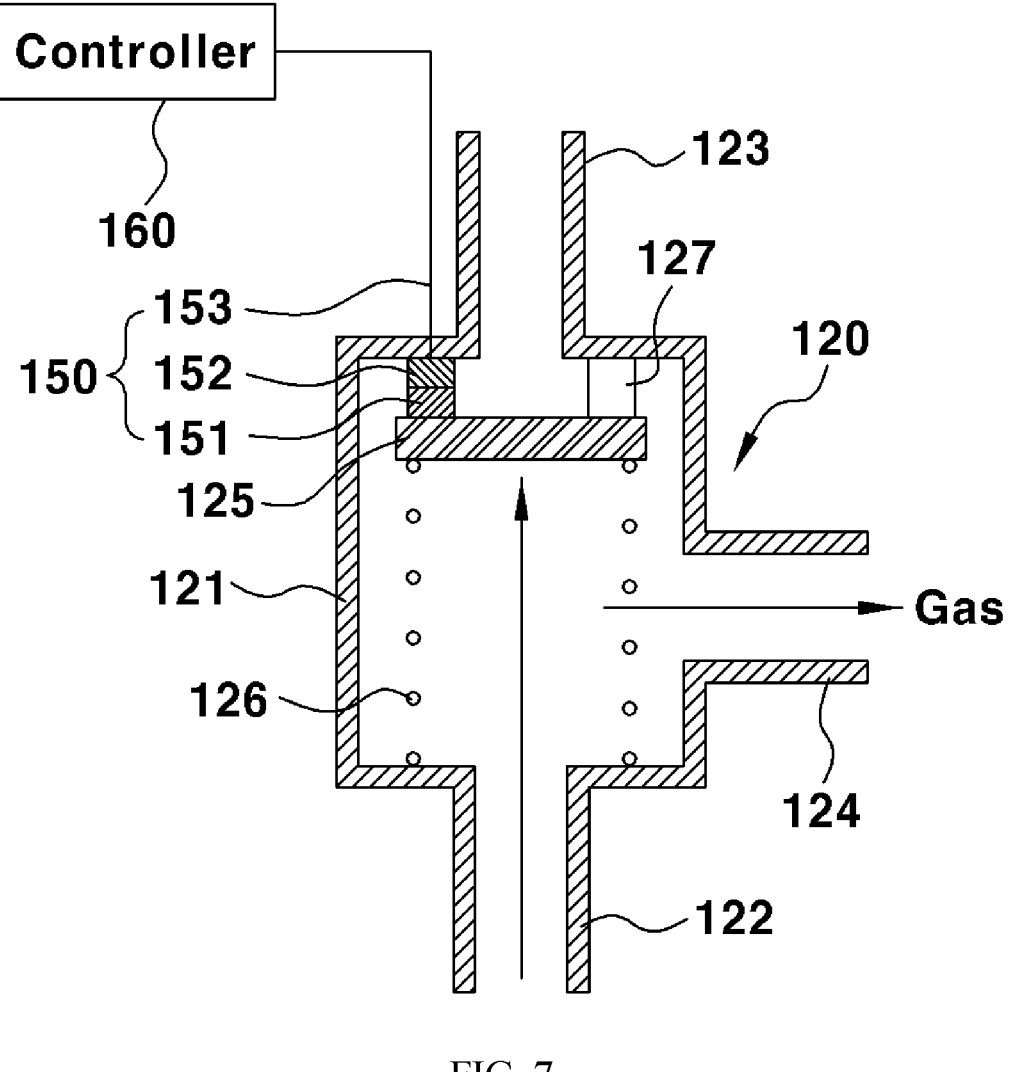
FIG. 7 is another cross-sectional view illustrating the configuration of the ventilation valve in the fire extinguishing system according to embodiments of the present disclosure.

FIGS. 6 and 7 are cross-sectional views illustrating the configuration of the ventilation valve in the fire extinguishing system according to embodiments of the present disclosure. FIG. 6 illustrates a state in ordinary times, and FIG. 7 illustrates a state when a fire has occurred.

As illustrated in FIGS. 6 and 7, the ventilation valve 120 includes a valve housing 121 having a ventilation port 122 connected to the venting path portion 116 of the pressure balancing element 110, an atmosphere port 123 connected to an ambient atmosphere, and a connection port 124 to which the gas path portion 130 is connected; a valve body 125 disposed in the internal space of the valve housing 121 and configured to be moved by gas discharged from the battery pack 1 in the occurrence of a fire so as to close the atmosphere port 123; and a spring 126 disposed in the internal space of the valve housing 121 to support the valve body 125.

The valve housing 121 is configured such that the internal space thereof communicates with the internal space of the venting path portion 116. Thus, the internal space of the valve housing 121 communicates with the internal space of the venting path portion 116 and the internal space of the connector 113 of the pressure balancing element 110 and further communicates with the internal space of the vent portion 111 and the internal space of the battery housing 2 through the waterproof ventilation membrane member 117.

In the ventilation valve 120, the atmosphere port 123 may be configured to be positioned on the upper end of the valve housing 121, and the connection port 124 may be configured to be positioned on a side portion of the valve housing 121. In the ventilation valve 120, the valve body 125 is positioned to open the atmosphere port 123 in ordinary times and is positioned to constantly open the connection port 124.

The spring 126 is disposed to be positioned below the valve body 125, and maintains the position of the valve body 125 such that the valve body 125 is in a position to open the atmosphere port 123 and the connection port 124. In particular, the spring 126 maintains the position of the valve body 125 such that the valve body 125 is positioned to constantly open the connection port 124 not only in the occurrence of a fire but also in ordinary times.

As can be seen from FIGS. 6 and 7, the valve body 125 is provided in the shape of a plate (see the plate 5 in FIG. 2), disposed in the internal space of the valve housing 121 in the lateral direction, and positioned between the valve body 125 and the valve housing 121 such that the spring 126 positioned below the valve body 125 supports the valve body 125 positioned above the spring 126.

As described above, the connection port 124 is a port constantly open irrespective of the occurrence of a fire, the discharge of gas from the battery pack, or the position of the valve body 125. Referring to FIG. 6, it may be understood that the position of the valve body 125 supported by the spring 126 is above the position of the connection port 124 in ordinary times. Thus, the connection port 124 is a constantly open port, instead of being configured to be closed by the valve body 125.

In contrast, the atmosphere port 123 is a port that is opened and closed by the valve body 125. In ordinary times, the valve body 125 maintains the atmosphere port 123 in an opened position and closes the atmosphere port 123 in the occurrence of a fire.

In the occurrence of a fire, gas produced by the battery pack 1 passes through the pressure balancing element 110 and then enters the valve housing 121 of the ventilation valve 120 through the ventilation port 122. The gas that has entered the valve housing 121 pushes the valve body 125 upward. At this time, the valve body 125 moves toward the atmosphere port 123 by overcoming the force of the spring 126, thereby closing the atmosphere port 123. The connection port 124 remains opened irrespective of the position of the valve body 125 even in the occurrence of a fire.

Thus, when the atmosphere port 123 is in the opened position, the atmosphere port 123, the internal space of the valve housing 121, the internal space of the venting path portion 116 of the pressure balancing element 110, the internal space of the connector 113, and the internal space of the vent portion 111 having the waterproof ventilation membrane member 117 between the vent portion 111 and the venting path portion 116 are used as a gas path for pressure balancing between inside and outside the battery housing 2. In addition, the connection port 124 of the ventilation valve 120 and the internal space of the gas path portion 130 to be described below are used as gas path for pressure balancing.

In ordinary times, as illustrated in FIG. 6, in a situation in which both the atmosphere port 123 and the connection port 124 are opened, gas moves between inside and outside the battery pack 1 through the pressure balancing element 110 and the ventilation valve 120, and balancing between inside and outside the battery pack 1 is accomplished. Since the connection port 124 is a constantly open port, gas may move between inside and outside the battery pack 1 through the connection port 124 and the gas path portion 130 connected to the connection port 124 in ordinary times.

In the occurrence of a fire, as illustrated in FIG. 7, the atmosphere port 123 is closed by the valve body 125, so that gas produced from the battery pack 1 is not discharged to the ambient atmosphere. Here, the gas produced from the battery pack 1 may be discharged only through the constantly open connection port 124. The gas discharged through the connection port 124 in this manner flows to the main fire detector 140 through the gas path portion 130.

Thus, the gas may be detected by the main fire detector 140, and the controller 160 may determine that a fire has occurred, on the basis of a signal from the main fire detector 140. Here, the gas is gas produced from the battery pack 1 in an early stage of the fire, more particularly, flammable gas produced from battery cells 3 accommodated in the battery housing 2.

In addition, in embodiments of the present disclosure, the sub-fire detector 150 may be provided in the ventilation valve 120. The sub-fire detector 150 is intended to detect a fire occurring within the battery pack 1, separately from the main fire detector 140.

As illustrated in FIGS. 6 and 7, the sub-fire detector 150 includes: a first magnetic resistor 151 disposed on the valve body 125; a second magnetic resistor 152 fixedly disposed in a position of the inner surface of the valve housing 121, adjacent to the atmosphere port 123, such that the first magnetic resistor 151 may be attached when the valve body 125 is moved to a position where the atmosphere port 123 is closed; and wiring 153 electrically connecting the first magnetic resistor 151 and the controller 160.

Although not shown in the figures, the controller 160 may include a current applier applying current to the wiring 153 connected to the first magnetic resistor 151 and the controller 160 and a current detector detecting a current value applied to the wiring 153. Thus, the controller 160 may apply a current having a set value through the wiring 153 by the current applier, and at the same time, detect the value of current flowing through the wiring 153 by the current detector.

Referring to FIGS. 6 and 7, the first magnetic resistor 151 is attached on one side of the valve body 125, and the second magnetic resistor 152 is attached to a position of one side of the inner surface of the valve housing 121, opposite the first magnetic resistor 151. In this structure, a buffer member 127 may be disposed on the other side of the valve body 125 or the other side of the inner surface of the valve housing 121.

An available example of the buffer member 127 may be made of a material having elasticity and shock absorbing performance, such as rubber. As illustrated in FIG. 7, when the atmosphere port 123 is closed by the valve body 125 moved upward by the force of gas in the occurrence of a fire, the buffer member 127 prevents the valve body 125 from directly contacting the valve housing 121 and serves to absorb shock between the valve body 125 and the valve housing 121.

Figure 8:
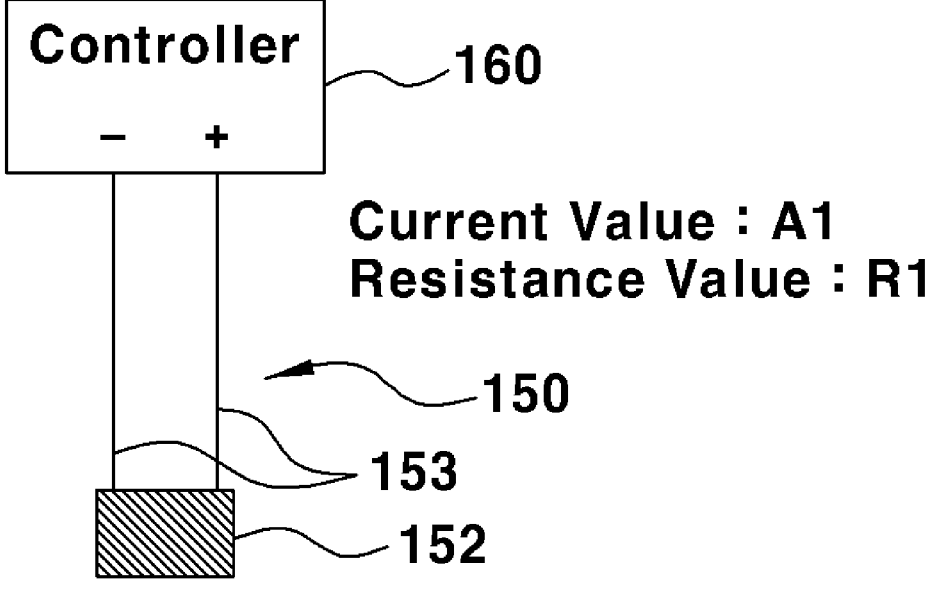
FIG. 8 is a diagram illustrating operating states of the sub-fire detector provided in the ventilation valve according to embodiments of the present disclosure.
Figure 8:
Figure 9:
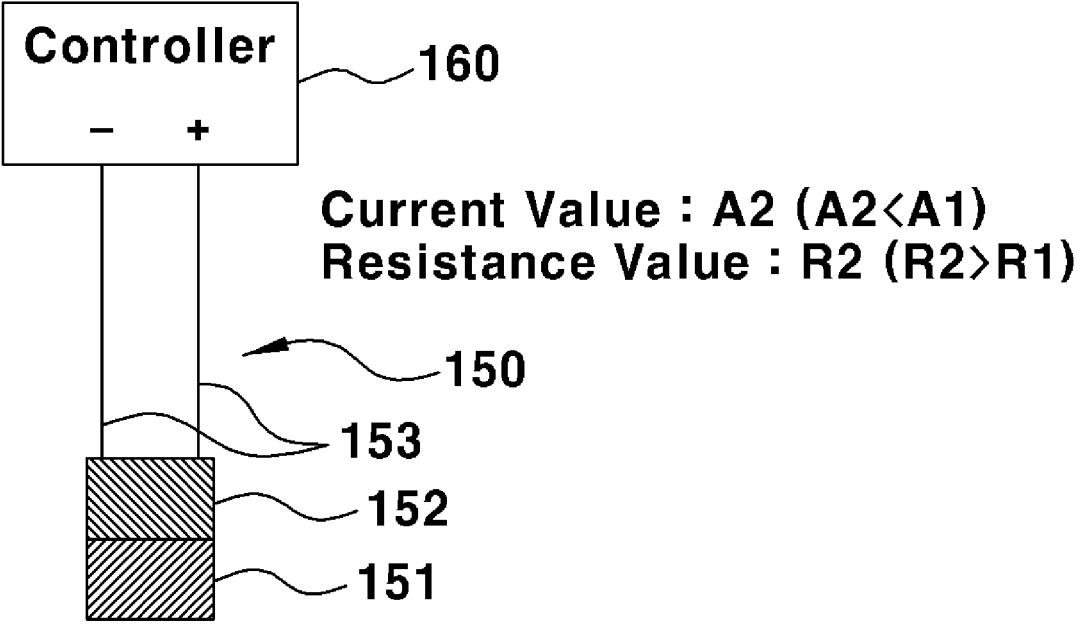
FIG. 9 is a diagram illustrating operating states of the sub-fire detector provided in the ventilation valve according to embodiments of the present disclosure.

FIGS. 8 and 9 are diagrams illustrating operating states of the sub-fire detector provided in the ventilation valve 120 according to embodiments of the present disclosure. FIG. 8 illustrates an ordinary state (no fire), and FIG. 9 illustrates a state when a fire has occurred.

In ordinary times, as illustrated in FIG. 8, when current is applied from the controller 160 through the wiring 153, only the wiring 153 and the second magnetic resistor 152 of the valve housing 121 are electrically connected. In contrast, in the occurrence of a fire, when the valve body 125 has closed the atmosphere port 123 due to gas produced from the battery pack 1, the first magnetic resistor 151 is attached to the second magnetic resistor 152 by magnetic force, as illustrated in FIG. 9.

In this manner, when the first magnetic resistor 151 is attached to and in contact with the second magnetic resistor 152, the resistance value on the electrically-connected path is increased by the first magnetic resistor 151 and the second magnetic resistor 152, thereby changing the value (i.e., intensity) of current flowing through the wiring 153.

That is, since the first magnetic resistor 151 and the second magnetic resistor 152 are separated from each other, when current flows through a path merely comprised of the wiring 153 and the first magnetic resistor 151, the value A1 of current (i.e. reference current) will be relatively increased. When the first magnetic resistor 151 and the second magnetic resistor 152 are in contact, the entire resistance value will be increased, and thus, the value A2 of current (i.e., actual current) flowing through the wiring 153, the first magnetic resistor 151, and the second magnetic resistor 152 will be reduced than when the two magnetic resistors are separated.

Thus, the controller 160 reads the value of current (i.e., the value of a signal of the sub-fire detector) flowing through the wiring 153. When the value of detected current is smaller than a set value, the controller 160 may determine that a fire has occurred. When the value of detected current is reduced to be smaller than a set value, it is possible to determine that a fire has occurred.

Alternatively, the controller 160 may be configured to determine that a fire has occurred when the value of current is equal to or greater than the set value. In this manner, the controller 160 may read the value of current flowing through the wiring 153 of the sub-fire detector 150 and first determine whether or not a fire has occurred in the battery pack 1, on the basis of a change in the value of current.

In particular, the sub-fire detector 150 is a first fire detector disposed in the ventilation valve 120 together with the pressure balancing element 110 and the ventilation valve 120. A single sub-fire detector 150 is disposed in every battery pack 1. The controller 160 may determine a battery pack in which a fire has occurred, on the basis of a signal from the sub-fire detector 150 disposed in each battery pack 1. That is, when the value of current of any one of the entire battery packs 1, i.e., a signal value of the sub-fire detector 150, is equal to or smaller than a set value or a change in the value of current is equal to or greater than a set amount, the corresponding battery pack may be determined to be a battery pack in which a fire has occurred.

In addition, as illustrated in FIG. 3, the gas path portion 130 in the fire extinguishing system 100 according to embodiments of the present disclosure may include: a main path portion 131 connected to the extinguishing agent supply unit 170 such that a fire extinguishing agent that the extinguishing agent supply unit 170 supplies may be input through the main path portion 131; and branch path portions 132 branched from one end of the main path portion 131 and connected to the connection ports 124 of the ventilation valves 120 disposed on the plurality of battery packs 1, respectively. In this configuration, a terminal end of the gas path portion 130, i.e., the other end of the main path portion 131 has an open structure to communicate with the ambient atmosphere.

In addition, the extinguishing agent supply unit 170 may include: an extinguishing agent storage tank 171 in which a fire extinguishing agent is stored; an extinguishing agent supply path portion 172 connected to an outlet of the extinguishing agent storage tank 171 and the main path portion 131 of the gas path portion 130; and an extinguishing agent supply pump 173 disposed on the extinguishing agent supply path portion 172 and configured to intake the fire extinguishing agent from the extinguishing agent storage tank 171 to deliver and supply the fire extinguishing agent to the main path portion 131 of the gas path portion 130 through the extinguishing agent supply path portion 172.

The extinguishing agent supply pump 173 is drive-controlled by the controller 160. When driven, the extinguishing agent supply pump 173 intakes the fire extinguishing agent in the extinguishing agent storage tank 171 and delivers the fire extinguishing agent through the extinguishing agent supply path portion 172, so that the delivered fire extinguishing agent may be supplied to the main path portion 131 through the extinguishing agent supply path portion 172.

In embodiments of the present disclosure, a first on/off valve 174 may be disposed on the extinguishing agent supply path portion 172 connected to an outlet side of the extinguishing agent supply pump 173, such that the on/off operation of the first on/off valve 174 is controlled by the controller 160. The first on/off valve 174 is an electric valve that remains in a closed position to close the fire extinguishing agent supply path in ordinary times and operates to open the fire extinguishing agent supply path in response to a control signal output by the controller 160 that has finally determined the occurrence of a fire in the battery pack 1 by the main fire detector 140.

Thus, in a situation in which the first on/off valve 174 is opened by the controller 160, when the extinguishing agent supply pump 173 is started by the controller 160, the fire extinguishing agent stored in the extinguishing agent storage tank 171 may be supplied to the main path portion 131 of the gas path portion 130 through the extinguishing agent supply path portion 172. The fire extinguishing agent supplied to the main path portion 131 of the gas path portion 130 may be supplied to the battery pack 1 in which a fire has occurred through the corresponding branch path portion 132 of the gas path portion 130.

The main fire detector 140 is disposed on the main path portion 131 of the gas path portion 130. Specifically, the main fire detector 140 may be disposed in a position between a portion of the main path portion 131, to which the extinguishing agent supply path portion 172 is connected, and the open terminal end of the main path portion 131. The main fire detector 140 may be a sensor detecting gas occurring in the battery cells 3 in the occurrence of a fire, for example, a carbon monoxide sensor detecting the concentration of carbon monoxide (CO).

The main fire detector 140 is connected to the controller 160 to input a signal resulting from the occurrence of a fire to the controller. Thus, the controller 160 may recognize the occurrence of a fire inside the battery pack 1, on the basis of the signal from the main fire detector 140. For example, when the concentration of carbon monoxide among gases detected by the main fire detector 140 is equal to or higher than a set value of concentration, the controller 160 may determine the occurrence of a fire inside the battery pack 1.

Accordingly, as described above, the controller 160 may identify the battery pack in which a fire has actually occurred from among the entire battery packs 1 mounted on a vehicle, on the basis of the signal from the sub-fire detector 150, and finally determine the occurrence of a fire in the battery pack 1 mounted on the vehicle, on the basis of the signal from the main fire detector 140.

In addition, during the supply of the fire extinguishing agent to the main path portion 131 from the extinguishing agent supply unit 170, when the fire extinguishing agent supplied to the main path portion 131 flows toward the open terminal end of the main path portion, the fire extinguishing agent may be discharged to the outside through the open terminal end of the main path portion. Thus, a second on/off valve 175 is provided to selectively close a path leading to the open terminal end, thereby allowing the fire extinguishing agent from the main path portion 131 to only flow toward the branch path portions 132.

The second on/off valve 175 may be disposed in a position between a portion of the main path portion 131, to which the extinguishing agent supply path portion 172 is connected, and the main fire detector 140. The second on/off valve 175 is an electric valve, the on/off operation of which is controlled by a control signal from the controller 160. In ordinary times, the second on/off valve 175 remains in a position of opening the main path portion 131 in ordinary times, and is operated to close the main path portion 131 by a control signal output by the controller 160 that has finally determined the occurrence of a fire in the battery pack 1 by the main fire detector 140.

In addition, the fire extinguishing system 100 according to embodiments of the present disclosure may further include a gas intake device 180 applying intake force to the main path portion 131 on the rear end side (i.e., the downstream side) of the main fire detector 140. The gas intake device 180 is a component supplying intake force to the main path portion 131 such that gas produced from the battery pack 1 in the occurrence of a fire may rapidly pass through the main fire detector 140 in the main path portion 131.

The gas intake device 180 may include an intake force generator 181, the operation of which is controlled by the controller 160, and an intake path portion 182 connecting the intake force generator 181 and the main path portion 131. The intake force generator 181 may be a vacuum pump, a compressor, etc. The position on the main path portion 131, to which the intake path portion 182 is connected, is a position between the main fire detector 140 and the open terminal end.

A third on/off valve 183 may be disposed on the intake path portion 182. The third on/off valve 183 is an electric valve, the on/off operation of which is controlled by a control signal output by the controller 160. The controller 160 maintains the third on/off valve 183 remains in a position of closing the intake path portion 182 in a normal state, and is operated to open the intake path portion 182 by a control signal output by the controller 160 that has determined the occurrence of a fire in the battery pack 1 by the sub-fire detector 150.

When a fire is finally determined to have occurred by the main fire detector 140, the third on/off valve 183 that has performed the opening operation as above is operated to close the intake path portion 182 again by a control signal output by the controller 160.

In addition, the fire extinguishing system 100 according to embodiments of the present disclosure may further include a path control valve 190 controlling the flow open/close position of each of the branch path portions 132 so that the fire extinguishing agent supplied to the main path portion 131 by the extinguishing agent supply unit 170 may be only supplied from the main path portion 131 to one of the branch path portions 132 connected to the battery pack 1 in which a fire has occurred.

As illustrated in FIG. 3, the path control valve 190 may be disposed in a position in which the branch path portions 132 are connected to the main path portion 131. Here, the control valve 190 is an electric valve configured such that on/off positions of internal paths thereof is controlled by a control signal output by the controller 160. More particularly, the control valve 190 may be a multi-way valve capable of controlling the on/off position of each of paths connected to ports of the valve housing.

For example, in the embodiment illustrated in FIG. 3, in which a total of three battery packs 1 are used, a four-way valve may be disposed in a position in which the three branch path portions 132 are branched from the main path portion 131. Here, a three-way valve, a five-way valve, a six-way valve, or so on may be selectively used depending on the number of the battery packs 1 and the number of the branch path portions 132.

In ordinary times, the path control valve 190 opens all of the branch path portions 132 connected to the battery packs 1 such that the branch path portions 132 communicate with the main path portion 131. However, when it is finally determined that a fire has occurred in the battery pack 1, the path control valve 190 is controlled to maintain only the branch path portion 132 of the battery pack 1 in which a fire has occurred and close all of the remaining branch path portions 132 by a control signal output by the controller 160.

Consequently, only the branch path portion 132 of the battery pack 1 in which a fire has occurred communicates with the main path portion 131. Thus, the fire extinguishing agent supplied to the main path portion 131 by the extinguishing agent supply unit 170 may be only supplied to the battery pack 1 in which a fire has occurred through the branch path portions 132.

Although the four-way valve, the on/off positions of the internal paths of which are controlled by the controller 160, is provided as the path control valve 190 in the embodiment illustrated in FIG. 3, the path control valve 190 may include a plurality of on/off valves rather than being implemented as the four-way valve, wherein the on/off valves are disposed on the branch path portions 132, respectively, to be independently on/off controlled by the controller 160.

The on/off valves are electric valves that are individually on/off operated by a control signal output by the controller 160. The on/off valves are disposed to open and close the paths of the branch path portions 132, respectively. Each of the on/off valves may be implemented as, for example, a solenoid valve.

When it is determined that a fire has occurred in a specific battery pack 1 among the entire battery packs 1 by the sub-fire detector 150 and the main fire detector 140, the controller 160 may control the on/off valves to only open the branch path portion 132 of the battery pack 1 in which a fire has occurred while closing the branch path portions 132 of the remaining battery packs 1 on which no fire has occurred.

In addition, the fire extinguishing system 100 according to embodiments of the present disclosure may further include a warning device 200 configured to warn the occurrence of a fire by a control signal output by the controller 160 when it is determined that a fire has occurred in the battery pack 1 on the basis of signals from the main fire detector 140 and the sub-fire detector 150.

Here, the warning device 200 may be a sound output device configured to output an alarm notifying the occurrence of a fire in the vehicle or a display device of the vehicle configured to pop up or display an alarm message to notify the occurrence of a fire. The sound output device may include a speaker mounted on the vehicle, and the display device may be a display device of the vehicle cluster.

The configuration of the fire extinguishing system according to embodiments of the present disclosure has been described in detail hereinabove. Hereinafter, overall operating states of the fire extinguishing system will be described.

Figure 10:
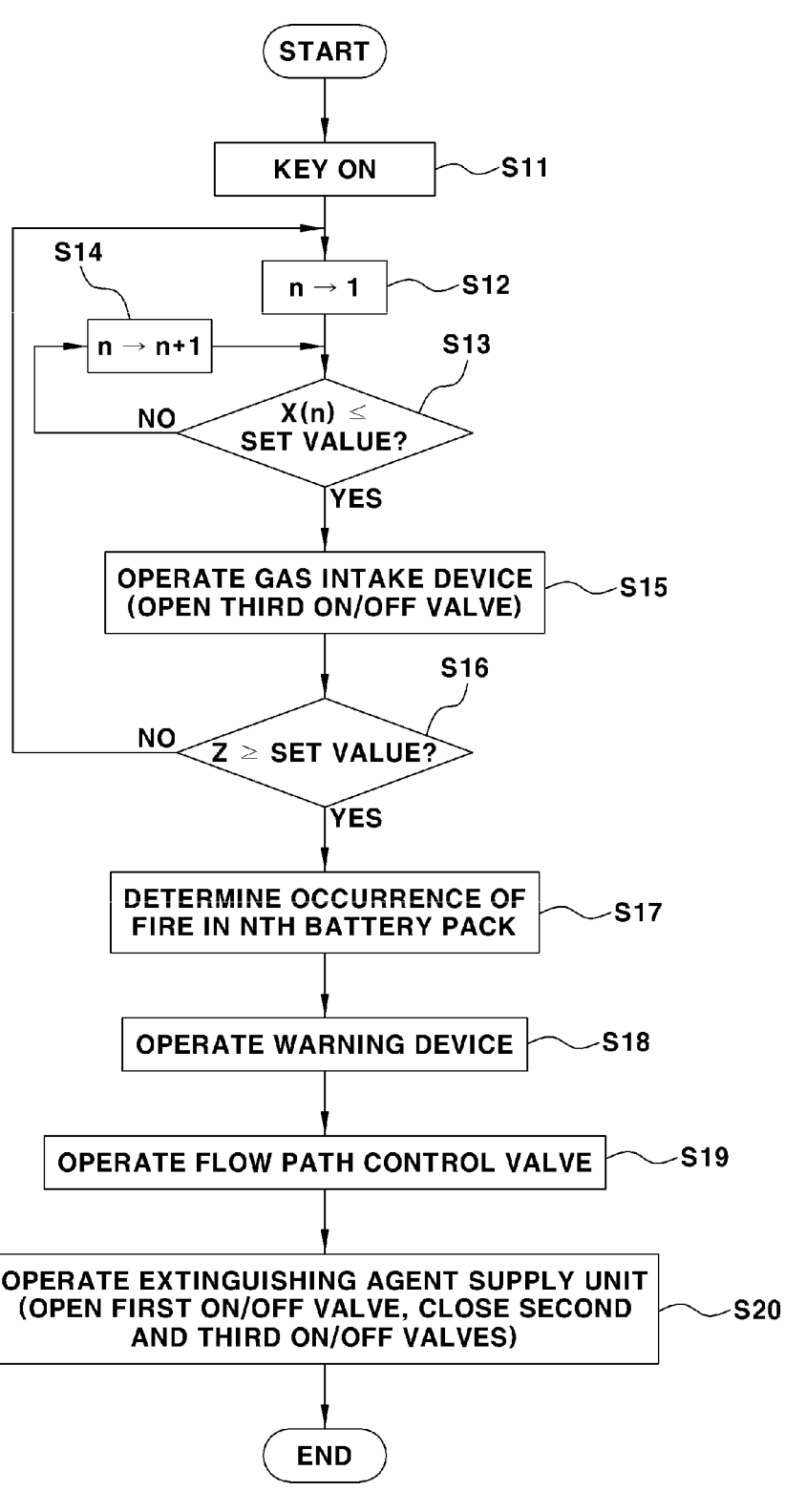
FIG. 10 is a flowchart illustrating the overall operation process of a fire extinguishing system for a battery according to embodiments of the present disclosure.

FIG. 10 is a flowchart illustrating the overall operation process of a fire extinguishing system for a battery according to embodiments of the present disclosure.

In a key on position of a vehicle in S11, the controller 160 monitors whether or not a fire has occurred in the battery packs 1 in real time on the basis of signals from the sub-fire detector 150 and the main fire detector 140 in S12 to S14. When a fire has occurred in any of the battery packs 1, gas is discharged from the battery pack 1 in which a fire has occurred. At this time, the discharged gas passes through the pressure balancing element 110 and the ventilation valve 120, and then flows through the gas path portion 130.

Here, the controller 160 may determine whether or not a fire has occurred in the battery packs 1 on the basis of a signal from the main fire detector 140, and identify one battery pack 1 in which a fire has occurred among the entire battery packs 1 on the basis of a signal from the sub-fire detector 150.

The process of identifying the battery pack 1 in which a fire has occurred will be described as follows. In general, the controller 160 performs real-time monitoring by reading values of the signals from the sub-fire detectors 150 disposed on the battery packs 1, i.e., values of current flowing through the wiring 153 of the sub-fire detectors 150, and determine whether or not a current value X(n) of each line of the wiring 153 is equal to or smaller than a set value in S12 to S14.

The gas discharged from the battery pack 1 in which a fire @has occurred passes through the pressure balancing element 110, and then enters the ventilation valve 120. The gas having entered the ventilation valve 120 pushes and moves the valve body 125, which is moved to a position in which the valve body 125 closes the atmosphere port 123 by overcoming the force of the spring 126 so that the gas is not discharged to the ambient atmosphere.

After the valve body 125 is moved to the position in which the valve body 125 closes the atmosphere port 123, the first magnetic resistor 151 and the second magnetic resistor 152 of the sub-fire detector 150 are attached to and in contact with each other. At this time, the controller 160 may read the value of current flowing through the wiring 153.

When the value of current flowing through the wiring 153 is equal to or smaller than the set value (or a change in the value of current is equal to or greater than a set amount), the controller 160 determines that a fire has occurred in the corresponding battery pack 1. Consequently, the controller 160 may detect the battery pack 1 in which a fire has occurred among the entire battery packs 1.

In addition, when it is determined that a fire has occurred in at least one of the entire battery packs 1 on the basis of the signal from the sub-fire detector 150 as described above, the controller 160 outputs control signals to control the operation of the third on/off valve 183 and the operation of the gas intake device 180. Here, control signals for opening the third on/off valve 183 and operating the gas intake device 180 are output.

Responsively, the third on/off valve 183 is opened, and the gas intake device 180 is operated, so that intake force acts on the main path portion 131 of the gas path portion 130 through the intake path portion 182 in S15. The gas produced from the battery pack 1 is intaken into the main path portion 131 by the intake force acting on the main path portion 131. At this time, the gas passes through the main fire detector 140.

The main fire detector 140 may detect the concentration Z of a specific component, for example, carbon monoxide (CO), in the gas passing through the main path portion 131, and output a signal regarding the concentration Z of the specific component to the controller 160. Then, the controller 160 determines whether or not the concentration Z of the specific component in the gas is equal to or higher than a set value of concentration, on the basis of the signal from the main fire detector 140, in S16. When the concentration Z of the specific component is higher than the set value of concentration, the controller 160 finally determines that a fire has occurred in the battery pack 1 (i.e., the nth battery pack 1 in FIG. 10), from which the occurrence of a fire has been detected by the sub-fire detector 150, in S17.

When it is finally determined that a fire has occurred in the battery pack 1 as described above, the controller 160 stops the operation of the gas intake device 180 and then operates the warning device 200 to warn a driver and occupants of the occurrence of a fire in S18, and outputs control signals to extinguish the fire.

Here, the operation of the path control valve 190 is controlled by the control signal output by the controller 160 so as to only open the branch path portions 132 connected to the battery pack 1 in which a fire has occurred and close the remaining branch path portions 132 in S19.

In addition, in response to the control signal output by the controller 160, the second on/off valve 175 and the third on/off valve 183 are operated to close the main path portion 131 and the intake path portion 182, and the first on/off valve 174 is operated to open the extinguishing agent supply path portion 172.

Subsequently, the extinguishing agent supply pump 173 is operated by the control signal output by the controller 160, so that the fire extinguishing agent stored in the extinguishing agent storage tank 171 is supplied to the main path portion 131 through the extinguishing agent supply path portion 172 by the operating extinguishing agent supply pump 173, in S20.

The fire extinguishing agent supplied to the main path portion 131 as described above is only supplied to the branch path portion 132 having the opened flow path through the path control valve 190, passes through the ventilation valve 120 and the pressure balancing element 110 in this order, and then is injected into the battery housing 2 of the battery pack 1 in which a fire has occurred. Consequently, the fire in the battery cells 3 in the battery pack 1 may be extinguished by the fire extinguishing agent injected into the battery housing 2 in S20.

Afterwards, the fire extinguishing agent supplied to the main path portion 131 passes through the path control valve 190, is supplied to the branch path portion 132 connected to the battery pack 1 in which a fire has occurred, and then enters the valve housing 121 of the ventilation valve 120 through the connection port 124 of the ventilation valve 120. Since the fire extinguishing agent entering the valve housing 121 through the connection port 124 continuously pushes the valve body 125 toward the atmosphere port 123, the atmosphere port 123 may be maintained in the closed position by the valve body 125.

In addition, after the fire extinguishing agent has passed through the ventilation valve 120, the fire extinguishing agent passes through the venting path portion 116, the internal space of the connector 113, and the internal space of the vent portion 111 of the pressure balancing element 110 in this order, and then is injected into the internal space of the battery housing 2. The waterproof ventilation membrane member 117 that has been closing the vent hole 112 of the vent portion 111 may have already been melted and removed by the high-temperature gas produced from the battery pack 1 before the fire extinguishing agent is supplied.

Even in the case that a portion of the waterproof ventilation membrane member 117 is not removed by the gas, the remaining portion of the waterproof ventilation membrane member 117 may be completely removed from the vent hole 112 of the vent portion 111, since the fire extinguishing agent having a high pressure is supplied. Thus, the fire extinguishing agent that has passed through the internal spaces of the venting path portion 116 and the connector 113 of the pressure balancing element 110 may pass through the vent hole 112 and then be supplied to the internal space of the battery housing 2.

As set forth above, the fire extinguishing system according to the present disclosure can rapidly and accurately detect a fire occurring on a battery of a vehicle and effectively extinguish the fire immediately upon detection.

In particular, according to the present disclosure, the inexpensive sub-fire detectors capable of being configured in a simple manner are disposed on the battery packs, respectively, and the single fire detector (i.e., the gas concentration sensor) measuring the concentration of gas is disposed on the main path portion. Accordingly, it is possible to determine both whether or not a fire has occurred and a battery pack in which a fire has occurred from among a plurality of battery packs using only the single main fire detector, which is expensive.

Furthermore, the use of the inexpensive sub-fire detectors to distinguish and identify the battery pack in which a fire has occurred and the use of the single main fire detector to determine whether or a fire has occurred in the battery, which is expensive, make it possible to reliably prevent erroneous fire detection, improve the accuracy of fire detection, and significantly reduce costs compared to a related-art situation in which an expensive gas concentration sensor is disposed on every battery pack.

In addition, since the fire extinguishing system according to the present disclosure performs the function of the pressure balancing element of the related art, the fire extinguishing system according to the present disclosure alone can balance the pressure of each battery pack without having to dispose several pressure balancing elements on each battery pack.

Although the specific embodiments of the present disclosure have been described in detail hereinabove, the scope of the present disclosure is not limited to the foregoing embodiments. Those skilled in the art will could make various modifications and improvements on the basis of the principle of the present disclosure defined in the appended claims without departing from the scope of the present disclosure as defined in the appended claims.

What is claimed is:

1. A fire extinguishing system for a vehicle battery, the system comprising:

a pressure balancing element disposed on a battery pack and providing a path through which gas moves between inside and outside a battery housing;

a gas path portion connected to the pressure balancing element through a ventilation valve, having a terminal end open to an ambient atmosphere, and configured such that gas moves between the gas path and the ambient atmosphere;

a main fire detector disposed on the gas path portion to detect a fire in the battery pack;

a controller outputting a control signal to extinguish the fire when the fire in the battery pack is detected by the main fire detector; and an extinguishing agent supply unit configured to supply a fire extinguishing agent to the gas path portion in response to the control signal of the controller, so that the fire extinguishing agent is supplied to the battery pack in which a fire has occurred through the ventilation valve and the pressure balancing element, wherein the ventilation valve comprises:

a ventilation port connected to the pressure balancing element;

an atmosphere port open to the ambient atmosphere and configured such that gas moves between the atmosphere port and the ambient atmosphere; and a connection port to which the gas path portion is connected, a valve housing comprising the ventilation port, the atmosphere port, and the connection port;

a valve body disposed in an internal space of the valve housing and configured to be moved by the gas entering through the pressure balancing element to close the atmosphere port; and a spring disposed in the internal space of the valve housing to support the valve body, wherein the connection port of the valve housing is configured as a port constantly open irrespective of a position of the valve body.

2. The fire extinguishing system of claim 1, wherein the pressure balancing element comprises:

a vent portion provided in a protruding shape on the battery housing and having a vent hole through which the gas enters and exits the pressure balancing element;

a connector coupled to the vent portion and communicating with an internal space of the vent portion and an internal space of the battery housing through the vent hole; and a venting path portion coupled to the connector such that an internal path thereof communicates with an internal space of the connector, wherein the ventilation valve is connected to the venting path portion.

3. The fire extinguishing system of claim 2, further comprising a waterproof ventilation membrane member disposed in the vent hole and configured to block entrance of external moisture into the battery housing while allowing gas to pass therethrough.

4. The fire extinguishing system of claim 3, wherein a sealing protrusion is provided on an inner circumferential surface, and a sealing member is situated between the sealing protrusion and a peripheral portion of the waterproof ventilation membrane member by press fitting to maintain airtightness.

5. The fire extinguishing system of claim 2, wherein the connector comprises:

a large diameter portion provided on one end;

a small diameter portion provided on the other end and having a smaller diameter than the large diameter portion; and a diameter reducing portion connecting the large diameter portion and the small diameter portion, wherein an inner circumferential surface of the large diameter portion is coupled to an outer circumferential surface of the vent portion.

6. The fire extinguishing system of claim 1, wherein the atmosphere port is configured to be closed by gas produced from inside the battery housing and entering through the pressure balancing element when a fire has occurred in the battery housing.

7. The fire extinguishing system of claim 1, wherein the battery pack comprises one of a plurality of battery packs, wherein the pressure balancing element and the ventilation valve are disposed in each of the plurality of battery packs, and wherein the gas path portion comprises:

a main path portion on which the main fire detector is disposed, and to which the extinguishing agent supply unit is connected; and a plurality of branch path portions branched from the main path portion and connected to the connection ports of the ventilation valves on the plurality of battery packs, respectively.

8. The fire extinguishing system of claim 7, further comprising sub-fire detectors disposed on the ventilation valves on the plurality of battery packs, respectively, to detect the fire in the battery packs, wherein the controller is configured to determine whether the fire has occurred on at least one battery pack among the battery packs and determine at least one battery pack among the battery packs in which a fire has occurred in accordance with signals from the main fire detector and the sub-fire detectors.

9. The fire extinguishing system of claim 8, wherein each of the sub-fire detectors comprises:

a first magnetic resistor disposed on the valve body;

a second magnetic resistor fixedly disposed on the valve housing, such that the first magnetic resistor is attached when the valve body is moved to a position where the atmosphere port is closed; and wiring electrically connecting the first magnetic resistor and the controller to each other.

10. The fire extinguishing system of claim 9, wherein the controller is provided to detect current flowing through the wiring while applying current to the wiring, and the controller is set to determine that a fire has occurred in a corresponding battery pack among the battery packs when a value of the detected current is equal to or smaller than a set value or a change in the value of the detected current is equal to or greater than a set amount.

11. The fire extinguishing system of claim 8, further comprising a path control valve disposed on the gas path portion, wherein a flow path of one branch path portion selected among the plurality of branch path portions selectively communicates with the main path portion through the path control valve, wherein the controller controls operations of the path control valve so that the branch path portion connected to the battery pack in which a fire has occurred communicates with the main path portion and the remaining branch path portions on the remaining battery packs without the fire are closed.

12. The fire extinguishing system of claim 11, wherein the path control valve comprises:

a multi-way valve to which the main path portion and the branch path portions are connected, or on/off valves disposed on the branch path portions, respectively, to be controlled by the controller to open or close flow paths of the branch path portions.

13. The fire extinguishing system of claim 8, wherein a gas intake device providing intake force to the gas path portion is connected to the main fire detector and a longitudinal end in the gas path portion, and the controller operates the gas intake device when it is determined from the signals of the sub-fire detectors that the fire has occurred.

14. The fire extinguishing system of claim 13, wherein the gas intake device comprises:

an intake force generator configured to be operated by the controller to generate intake force;

an intake path portion connecting the intake force generator and the gas path portion and the gas path portion so that the intake force is applied to the gas path portion by the intake force generator; and a third on/off valve disposed on the intake path portion such that on/off operation thereof is controlled by the controller.

15. The fire extinguishing system of claim 14, wherein the controller maintains the third on/off valve in a closed position in a normal state, and when the fire in the battery pack is detected by the sub-fire detector, opens the third on/off valve.

16. The fire extinguishing system of claim 1, wherein the extinguishing agent supply unit comprises:

an extinguishing agent storage tank in which the fire extinguishing agent is stored;

an extinguishing agent supply path portion connecting the extinguishing agent storage tank and a main path portion; and an extinguishing agent supply pump configured to operate in response to the control signal of the controller to supply the fire extinguishing agent in the extinguishing agent storage tank to the gas path portion through the extinguishing agent supply path portion.

17. The fire extinguishing system of claim 16, wherein a first on/off valve, on/off operation of which is controlled by the controller, is disposed on an outlet side of the extinguishing agent supply pump, and the controller maintains the first on/off valve in a closed position, and when the fire in the battery pack is detected, operates the first on/off valve to be opened.

18. The fire extinguishing system of claim 16, wherein a second on/off valve, on/off operation of which is controlled by the controller, is disposed between a portion of the gas path portion, to which the extinguishing agent supply path portion is connected, and the main fire detector, and the controller maintains the second on/off valve in an opened position, and when the fire in the battery pack is detected, operates the second on/off valve to be closed.

\* \* \* \* \*